(12) United States Patent
Gy et al.

(10) Patent No.: US 11,650,410 B2
(45) Date of Patent: May 16, 2023

(54) ELECTROCHEMICAL GLAZING HAVING ELECTRICALLY CONTROLLABLE OPTICAL AND ENERGY-RELATED PROPERTIES

(71) Applicant: SAGE ELECTROCHROMICS, INC., Faribault, MN (US)

(72) Inventors: René Gy, Bondy (FR); Jean-Christophe Giron, Edina, MN (US); Li-Ya Yeh, Geilenkirchen (DE); Philippe Letocart, Raeren (BE); Annabelle Andreau-Wiedenmaier, Aachen (DE); Philippe Armand, Paris (FR)

(73) Assignee: SAGE ELECTROCHROMICS, INC., Faribault, MN (US)

( * ) Notice: Subject to any disclaimer, the term of this patent is extended or adjusted under 35 U.S.C. 154(b) by 0 days.

(21) Appl. No.: 16/896,734

(22) Filed: Jun. 9, 2020

(65) Prior Publication Data

US 2020/0371343 A1    Nov. 26, 2020

Related U.S. Application Data

(63) Continuation of application No. 13/820,296, filed as application No. PCT/EP2011/061408 on Jul. 6, 2011, now Pat. No. 10,718,937.

(Continued)

(30) Foreign Application Priority Data

Jul. 16, 2010  (FR) .................................... 10/03004

(51) Int. Cl.
*G02B 26/02* (2006.01)
*B32B 17/10* (2006.01)
(Continued)

(52) U.S. Cl.
CPC ........ *G02B 26/02* (2013.01); *B32B 17/10045* (2013.01); *B32B 17/10055* (2013.01);
(Continued)

(58) Field of Classification Search
CPC  B32B 17/10045–10788; B32B 37/142; G02B 26/02; G02F 1/153
See application file for complete search history.

(56) References Cited

U.S. PATENT DOCUMENTS 3,865,294 A    2/1975  Ernsberger et al.
4,419,386 A   12/1983  Gordon
(Continued)

FOREIGN PATENT DOCUMENTS

CN         1510494 A     7/2004
DE    102006042538 A1    3/2008
(Continued)

OTHER PUBLICATIONS

A. B. Zhimalov et al.: "Science for glass production—laser cutting of float glass during production", published in Glass & Ceramics, p. 319-321, vol. 63, Nos. 9-10, 2006.
(Continued)

*Primary Examiner* — Maria V Ewald
*Assistant Examiner* — Ethan Weydemeyer
(74) *Attorney, Agent, or Firm* — Abel Schillinger, LLP; Robert N Young (57) ABSTRACT

The invention relates to glazing (1) comprising a first glazing sheet (10; 10A, 10B) forming a substrate on which at least one film of an electrochemical system (12) is formed, said system having optical and/or energy-related properties that are electrically controllable, a second glazing sheet (14) forming a counter-substrate, and a third glazing sheet (18). The substrate has characteristics that allow it to be obtained by being cut from a motherboard on which motherboard at
(Continued)

least one film or the electro-chemical system (12) is formed. The substrate is located between the counter-substrate (14) and the third glazing sheet (18) and is set back relative to the counter-substrate (14) and relative to the third glazing sheet (18) over the entire circumference of the substrate (10; 10A, 10B).

20 Claims, 4 Drawing Sheets

Related U.S. Application Data (60) Provisional application No. 61/376,792, filed on Aug. 25, 2010.

(51) Int. Cl.
| | | |
|---|---|---|
| *E06B 9/24* | (2006.01) | |
| *B32B 37/14* | (2006.01) | |
| *E06B 7/00* | (2006.01) | |
| *G02F 1/153* | (2006.01) | |

(52) U.S. Cl.
CPC .... *B32B 17/1077* (2013.01); *B32B 17/10174* (2013.01); *B32B 17/10293* (2013.01); *B32B 17/10513* (2013.01); *B32B 17/10761* (2013.01); *B32B 17/10788* (2013.01); *B32B 37/142* (2013.01); *E06B 7/00* (2013.01); *E06B 9/24* (2013.01); *E06B 2009/2464* (2013.01); *G02F 1/153* (2013.01)

(56) References Cited

U.S. PATENT DOCUMENTS

| | | | |
|---|---|---|---|
| 4,844,591 | A | 7/1989 | Arribart et al. |
| 5,124,832 | A | 6/1992 | Greenberg et al. |
| 5,154,334 | A | 10/1992 | Dekker et al. |
| 5,229,040 | A | 7/1993 | Desbat et al. |
| 5,239,406 | A | 8/1993 | Lynam |
| 5,244,557 | A | 9/1993 | Defendini et al. |
| 5,248,545 | A | 9/1993 | Proscia |
| 5,283,310 | A | 2/1994 | Armand et al. |
| 5,321,544 | A | 6/1994 | Parkhe et al. |
| 5,370,775 | A | 12/1994 | Parkhe |
| 5,404,244 | A | 4/1995 | Van Dine et al. |
| 5,501,919 | A | 3/1996 | Paul et al. |
| 5,507,965 | A | 4/1996 | Padoy et al. |
| 5,530,581 | A | 6/1996 | Cogan |
| 5,657,149 | A | 8/1997 | Buffat et al. |
| 5,659,417 | A | 8/1997 | Van Dine et al. |
| 5,668,663 | A | 9/1997 | Varaprasad et al. |
| 5,724,175 | A | 3/1998 | Hichwa et al. |
| 5,724,177 | A | 3/1998 | Ellis, Jr. et al. |
| 5,755,537 | A | 5/1998 | Lubbering |
| 5,757,537 | A | 5/1998 | Ellis, Jr. et al. |
| 5,825,526 | A | 10/1998 | Bommarito et al. |
| 5,889,608 | A | 3/1999 | Buffat et al. |
| 5,985,486 | A | 11/1999 | Giron et al. |
| 6,055,088 | A | 4/2000 | Fix et al. |
| 6,154,306 | A | 11/2000 | Varaprasad et al. |
| 6,186,384 | B1 | 2/2001 | Sawada |
| 6,195,193 | B1 | 2/2001 | Anderson et al. |
| 6,204,953 | B1 | 3/2001 | Zieba et al. |
| 6,252,197 | B1 | 6/2001 | Hoekstra et al. |
| 6,256,152 | B1 | 7/2001 | Coldrey et al. |
| 6,259,549 | B1 | 7/2001 | Leupolz et al. |
| 6,355,125 | B1 | 3/2002 | Tahon et al. |
| 6,407,360 | B1 | 6/2002 | Choo et al. |
| 6,502,423 | B1 | 1/2003 | Ostendarp et al. |
| 6,587,250 | B2 | 7/2003 | Armgarth et al. |
| 6,639,708 | B2 | 10/2003 | Elkadi et al. |
| 6,723,952 | B2 | 4/2004 | Choo et al. |
| 6,785,036 | B1 | 8/2004 | Berneth et al. |
| 7,015,118 | B2 | 3/2006 | Wakayama |
| 7,033,655 | B2 | 4/2006 | Beteille et al. |
| 7,074,486 | B2 | 7/2006 | Boire et al. |
| 7,110,157 | B2 | 9/2006 | Beteille et al. |
| 7,230,748 | B2 | 6/2007 | Giron et al. |
| 7,245,414 | B2 | 7/2007 | Liang et al. |
| 7,273,403 | B2 | 9/2007 | Yokota et al. |
| 7,372,610 | B2 | 5/2008 | Burdis et al. |
| 7,593,154 | B2 | 9/2009 | Burdis et al. |
| 7,710,671 | B1 | 5/2010 | Kwak et al. |
| 7,738,155 | B2 | 6/2010 | Agrawal et al. |
| 7,835,059 | B2 | 11/2010 | Giri et al. |
| 7,855,821 | B2 | 12/2010 | Baumann et al. |
| 7,884,994 | B2 | 2/2011 | Piroux |
| 8,102,585 | B2 | 1/2012 | Giron et al. |
| 8,218,224 | B2 | 7/2012 | Kwak et al. |
| 8,482,837 | B2 | 7/2013 | Sbar et al. |
| 8,482,838 | B2 | 7/2013 | Sbar et al. |
| 8,506,096 | B2 | 8/2013 | McCabe et al. |
| 9,182,644 | B2 | 11/2015 | Sbar et al. |
| 9,316,883 | B2 | 4/2016 | Sbar et al. |
| 2002/0054419 | A1 | 5/2002 | Beteille et al. |
| 2002/0118437 | A1 | 8/2002 | Rukavina et al. |
| 2002/0126365 | A1 | 9/2002 | Armgarth et al. |
| 2003/0209528 | A1 | 11/2003 | Choo et al. |
| 2003/0227663 | A1 | 12/2003 | Agrawal et al. |
| 2004/0067343 | A1 | 4/2004 | Beteille et al. |
| 2004/0086688 | A1 | 5/2004 | Hirano et al. |
| 2005/0002081 | A1 | 1/2005 | Beteille et al. |
| 2005/0025980 | A1* | 2/2005 | Agrawal ........... B32B 17/10871 428/426 |
| 2006/0065647 | A1 | 3/2006 | Kim et al. |
| 2006/0101858 | A1 | 5/2006 | Fujii |
| 2006/0187608 | A1 | 8/2006 | Stark |
| 2006/0191970 | A1 | 8/2006 | Kataoka et al. |
| 2007/0002422 | A1 | 1/2007 | O'Shaughnessy |
| 2007/0090100 | A1 | 4/2007 | Yonai et al. |
| 2007/0151962 | A1 | 7/2007 | Doll et al. |
| 2009/0027759 | A1 | 1/2009 | Albahri |
| 2009/0194514 | A1 | 8/2009 | Yue |
| 2009/0262411 | A1 | 10/2009 | Karmhag et al. |
| 2009/0297806 | A1 | 12/2009 | Dawson-Elli et al. |
| 2009/0316081 | A1 | 12/2009 | Nishida et al. |
| 2009/0316248 | A1 | 12/2009 | Karmhag et al. |
| 2010/0134865 | A1 | 6/2010 | Higuchi et al. |
| 2010/0208326 | A1 | 8/2010 | Kwak et al. |
| 2010/0210442 | A1 | 8/2010 | Abramov et al. |
| 2010/0279067 | A1 | 11/2010 | Sabia et al. |
| 2011/0049765 | A1 | 3/2011 | Li et al. |
| 2011/0261429 | A1 | 10/2011 | Sbar et al. |
| 2011/0267672 | A1 | 11/2011 | Sbar et al. |
| 2011/0297806 | A1 | 12/2011 | Park et al. |
| 2011/0304899 | A1 | 12/2011 | Kwak et al. |
| 2012/0047956 | A1 | 3/2012 | Li |
| 2013/0258437 | A1 | 10/2013 | Sbar et al. |
| 2013/0258438 | A1 | 10/2013 | Sbar et al. |
| 2013/0312341 | A1 | 11/2013 | Gy et al. |
| 2014/0370257 | A1 | 12/2014 | Dawson-Elli et al. |
| 2016/0187753 | A1 | 6/2016 | Sbar et al. |

FOREIGN PATENT DOCUMENTS

| | | |
|---|---|---|
| EP | 0253713 A1 | 1/1988 |
| EP | 0382623 A1 | 8/1990 |
| EP | 0408427 A1 | 1/1991 |
| EP | 0518754 A1 | 12/1992 |
| EP | 0521602 A1 | 1/1993 |
| EP | 0532408 A1 | 3/1993 |
| EP | 0575207 A1 | 12/1993 |
| EP | 0612826 A1 | 8/1994 |
| EP | 0670346 A1 | 9/1995 |
| EP | 0825478 A1 | 2/1998 |
| EP | 0831360 A1 | 3/1998 |
| EP | 1253461 A2 | 10/2002 |
| EP | 1434083 A2 | 6/2004 |
| FR | 2781062 A1 | 1/2000 |
| FR | 2829723 A1 | 3/2003 |
| JP | 57158623 A | 9/1982 |
| JP | S5891726 U | 6/1983 |

(56) References Cited

FOREIGN PATENT DOCUMENTS

| | | |
|---|---|---|
| JP | 59195629 A | 11/1984 |
| JP | H03164451 A | 7/1991 |
| JP | H06300992 A | 10/1994 |
| JP | 07-318877 A | 12/1995 |
| JP | H08313940 A | 11/1996 |
| JP | 2000290031 A | 10/2000 |
| JP | 2002289899 A | 10/2002 |
| JP | 2003197103 A | 7/2003 |
| JP | 2003308792 A | 10/2003 |
| JP | 2004148438 A | 5/2004 |
| JP | 2005314127 A | 11/2004 |
| JP | 2005037709 A | 2/2005 |
| JP | 2005527858 A | 9/2005 |
| JP | 2009023215 A | 2/2009 |
| JP | 2009294461 A | 12/2009 |
| JP | 2010506209 A | 2/2010 |
| JP | 2010108684 A | 5/2010 |
| JP | 2010194550 A | 9/2010 |
| JP | 2011524269 A | 9/2011 |
| JP | 2012511498 A | 5/2012 |
| JP | 2013503361 A | 1/2013 |
| WO | 0003290 A1 | 1/2000 |
| WO | 02-06889 A1 | 1/2002 |
| WO | 02-07967 A1 | 1/2002 |
| WO | 03098339 A2 | 11/2003 |
| WO | 2005007398 A2 | 1/2005 |
| WO | 2008045240 A2 | 4/2008 |
| WO | 2009-128334 A1 | 10/2009 |
| WO | 2010068525 A2 | 6/2010 |
| WO | 2010126977 A1 | 11/2010 |
| WO | 2011028254 A2 | 3/2011 |
| WO | 2011109688 A1 | 9/2011 |
| WO | 2012007335 A1 | 1/2012 |

OTHER PUBLICATIONS

V. S. Kondratenko et al.:"Laser strengthening of the edge of glass", published in J. Opt. Technol. 76 (II), p. 733-736, Nov. 2009.

A. A. Abramov et al.: "Laser separation of chemically strengthened glass", published in Physics Procedia 5 (201 0), p. 285-290 (relevant at least according to article 54 (3) EPC).

L.A. Shitova et al.: "Quality requires constant attention—Glass edge quality and strength", published in Steklo i Keramika, No. 8, pp. 2-3, Aug. 1991.

Presentation "Jenoptik—VOTAN Salas Series for the Photovoltaic Market", held on Dec. 29, 2009, in particularly slides 35-38, 32 pages.

Charles R. Kurkjian: "Strength of Inorganic Glass", proceedings of a NATO Advanced Research Workshop entitled Strength of Glass, held on Mar. 21-25, 1983, published in 1985, 11 pages.

Michael Degel, Jenoptik Automatisierungstechnik GmbH: "Latest state-of-the-art laser cutting development", published in the proceedings of "Glass Performance Days" in Tampere, Finland, Jun. 15-18, 2007.

International Search Report and Written Opinion, PCT/US11/27148, dated Jun. 7, 2011.

Vuolio, Aki, "Structural Behaviour of Glass Structures in Facades," Helsinki University of Technology Laboratory of Steel Structures Publications 27, Thesis for the Degree of Licentiate of Science in Technology, dated 2003, 163 pages.

Beason and Lignell (200) "A Thermal Stress Evaluation Procedure for Monolithic Annealed Glass", Symp on the Use of Glass in Buildings, ASTM STP1434, ed. VL Block.

Veer, FA, PC Louter and FP Bos, "The strength of annealed, heat-strengthened and fully tempered float glass," Fatigue & Fracture of Engineered materials & Structures, 32 pp. 18-25 (2009).

Wei, Hongli et al., "New Progress of Study on Inorganic Electrochromic Glass," Glass, No. 1, Feb. 28, 2006, pp. 34-37 (English Summary Provided, 1 page).

Internaitonal Search Report and Written Opinion for Applicaiton No. PCT/EP2011/061408, dated Oct. 10, 2011, 11 pages.

International Search Report and Written Opinion for Application No. PCT/EP2011/061407, dated Sep. 27, 2011, 11 pages.

International Search Report and Written Opinion for Application No. PCT/EP2011/060363, dated Sep. 22, 2011, 9 pages.

Domone et al., "Construction Materials—Their Nature and Behavior," Dec. 2001, Taylor and Francis, 4th Edition, pp. 509-518.

Veer, F.A., "The strength of glass, a a nontransparent value," HERON, vol. 52, No. 1/2, pp. 87-104.

Hermanns, Christoph, "Laser cutting of glass," SPIE (International Symposium on Optical Science and Technology), Proceeding vol. 4102, Oct. 25, 2000, pp. 219-226.

\* cited by examiner

ELECTROCHEMICAL GLAZING HAVING ELECTRICALLY CONTROLLABLE OPTICAL AND ENERGY-RELATED PROPERTIES

BACKGROUND OF THE INVENTION

The present invention relates to the field of electrochemical multiple glazing units having electrically controllable optical and/or energy-related properties.

Certain characteristics of these glazing units can be modified using an appropriate power supply, especially the transmission, absorption and reflection of certain wavelengths of electromagnetic radiation, especially in the visible and/or infrared, or even the diffusion of light. The transmission is generally varied in the optical (infrared, visible and ultraviolet) range and/or in other ranges of electromagnetic radiation, hence the device is said to have variable optical and energy-related properties, the optical range not necessarily being the only range in question.

From the thermal standpoint, glazing whose transmission/absorption/reflection may be varied within at least part of the solar spectrum allows the solar heat influx into rooms or passenger areas/compartments to be controlled when it is fitted as exterior glazing in buildings or as windows in transportation means of the type comprising automobiles, trains, airplanes, ships, etc., and thus it allows excessive heating of the latter to be prevented should there be strong sunlight.

From the optical standpoint, the glazing allows the degree of vision to be controlled, thereby making it possible to prevent glare should there be strong sunlight, when it is mounted as exterior glazing. It may also have a particularly advantageous shutter effect.

DESCRIPTION OF THE PRIOR ART

WO-2005/007398 describes laminated glazing incorporating an electrochromic, and more particularly an all-solid-state, electrochemical system having electrically controllable optical properties.

All the films of the electrochromic system are formed on the same glass substrate.

The substrate is laminated to a counter-substrate via a lamination interlayer so as to form a laminated glazing unit.

For certain applications such as in buildings, it is necessary for the substrate to be able to withstand significant temperature gradients. This is because, since the films formed on the substrate are absorbent in a plurality of solar spectral regions, the substrate is liable to become very hot, especially in its central part. As for the peripheral part of the substrate, this is generally shaded, especially by the frame that holds the glazing. Because of this, the peripheral part remains cooler than the central part.

The temperature differences between the central part and the peripheral part of the glazing then induce mechanical stresses liable to break the glazing.

This is even more critical when the substrate is of colored glass or, more generally, made of glass absorbent in certain regions of the solar spectrum.

BRIEF DESCRIPTION OF THE INVENTION

The object of the invention is to provide electrochemical glazing having electrically controllable optical and/or energy-related properties able to withstand significant thermal stresses while also limiting the manufacturing cost.

For this purpose, one subject of the invention is a glazing unit comprising:

a first glazing sheet forming a substrate on which at least one film of an electrochemical system is formed, said system having optical and/or energy/related properties that are electrically controllable;

a second glazing sheet forming a counter-substrate; and a third glazing sheet;

in which:

the substrate has characteristics that allow it to be obtained by being cut from a motherboard on which at least one film of the electrochemical system is formed;

the substrate is located between the counter-substrate and the third glazing sheet;

the substrate is set back relative to the counter-substrate over the entire circumference of the substrate; and the substrate is set back relative to the third glazing sheet over the entire circumference of the substrate.

One possible way of preventing the glass substrate from breaking consists in thermally or chemically tempering it so that it can withstand a temperature difference between a point on the central part of the substrate and a point on the edge of the substrate of at least 50° C. and preferably at least 100° C.

However, the films of many electrochemical systems having electrically controllable optical properties are liable to be severely damaged if they undergo the thermal tempering applied to the glass sheet, and it is not possible to chemically temper the glass sheet while the films are present on it.

Thermal tempering in fact consists in rapidly cooling, using air jets, the glass sheet heated to above 600° C., for example to 630° C.

Chemical tempering consists in immersing the glass sheet in a bath of molten salts ($KNO_3$ for soda-lime glasses). Above a certain temperature (400° C.), there is a chemical exchange between $KNO_3$ and $NaNO_3$ salts, $K^+$ replacing the smaller $Na^+$. This replacement compresses the outer surfaces of the glass sheet and makes the glass more resistant to mechanical forces or to temperature differences between the edges and the center of the glass. The nature of the ions depends on the chemical composition of the glass.

The same also applies to toughened glass, which is a thermally tempered glass the heating and principally cooling parameters of which are different from the thermal tempering parameters (longer cooling time).

One possible solution would therefore consist in depositing the films of the electrochromic system on the substrate after the latter has been tempered or toughened.

However, this solution is expensive.

So as to reduce cost, one idea of the invention is to cut the substrate after the films have been deposited so as to obtain a plurality of substrates from the same motherboard.

Cutting from a motherboard furthermore has the advantages of making the production line more flexible, of making the production process more stable and of providing higher yields.

However, tempered or toughened glass is difficult or even impossible to cut.

Setting on substrate back relative to the counter-substrate and to the third glazing sheet makes it possible to use glass that has, for example, not been tempered or even toughened. This has both the advantage of making it easy to cut the glass, and therefore obtaining the substrate by cutting it from a motherboard, and the advantage of not risking damage to the films of the functional system.

It has in fact been shown that the reason that such glass breaks is because of damage, even microscopic damage, to the surface state of the edges during the operation of shaping the glass and/or the manufacture of the glass and/or during even a very slight impact of the edge of the substrate with an external element.

This damage may be impossible to detect and may manifest itself only when the glazing is heated. Furthermore, such an impact may well occur after the manufacture of the glazing, for example during its transportation or while it is being fitted into a building.

Each impact is liable to cause a microcrack in the surface of the edges of the substrate and each microcrack is liable to initiate crack propagation in the presence of a thermal gradient between the center and the edges of the glazing.

Setting the substrate back relative to the counter-substrate and relative to the third glazing sheet ensures that the glazing is held without contacting the substrate and ensures that the substrate is protected from any inadvertent contact.

For example, glass that has not been tempered or toughened may then be used as a substrate if the surface state of its edges is good enough. Experiments have shown that a thermally cut glass that has not been tempered or even toughened may have sufficient mechanical strength.

Furthermore, glass that is neither tempered nor toughened has fewer particles contaminating its surface, which particles are liable to cause defects (pinholes, short-circuits, etc.) in the final glazing.

Finally, glass that has not been tempered is flatter which makes lamination easier and allows a thinner lamination interlayer to be used. The glass is even flatter if it has not been toughened.

According to the particular embodiments, the glazing unit according to the invention furthermore comprises one or more of the following technical features, applied individually or in any technically possible combination:

The substrate is set back relative to the counter-substrate and/or the third glazing sheet over the entire circumference of the substrate by at least 1 mm, preferably at least 2 mm, more preferably at least 5 mm and even more preferably at least 10 mm;

The substrate is made of glass that has not been thermally tempered, preferably that has not been chemically tempered and more preferably that has not been toughened;

The substrate is obtained by thermal cutting of the motherboard;

The substrate is able to withstand a temperature difference between a point on the substrate and a point on the edge of the substrate of at least 50° C. and preferably of at least 100° C.;

The substrate has a 4-point bending strength greater than or equal to 75 MPa, preferably greater than or equal to 100 MPa and more preferably greater than or equal to 120 MPa;

The counter-substrate and/or the third glazing sheet are made of toughened or tempered glass;

The counter-substrate is intended to be placed on the outside relative to the substrate, that is to say on the side on which sunlight is incident;

The electrochemical system is formed from a multilayer of films electrode coating, a first electrochemically active file, an electrolyte film, a second electrochemically active film and second electrode coating, all the films of the multilayer being formed on the substrate;

The glazing is multiple glazing, the third glazing sheet being spaced from the substrate and separated from the substrate by a layer of gas or vacuum;

The substrate is surrounded by said layer of gas or vacuum, preferably over the entire circumference and the entire thickness of the substrate;

The glazing comprises a joint surrounding the substrate and in contact with the substrate over at least part of the circumference of the substrate, preferably in contact with the substrate over the entire circumference of the substrate;

The substrate is made of soda-lime-silica glass;

All the films of the electrochemical system are formed on the substrate;

The glazing comprises a fourth glazing sheet forming a second substrate, the second substrate being set back relative to the counter-substrate and to the third glazing sheet; and The glazing comprises a lamination interlayer, the substrate being laminated to the counter-substrate via the lamination interlayer.

Another subject of the invention is a process for manufacturing a glazing unit, comprising steps consisting in:

Depositing at least one film of an electrochemical system, said system having optical and/or energy-related properties that are electrically controllable, only a first glazing sheet that forms a motherboard and cutting from the motherboard a substrate provided with at least one film of the electrochemical system;

Securing the substrate obtained by cutting to a second glazing sheet that forms a counter-substrate; and Securing the counter-substrate to a third glazing substrate, In which the substrate is a glass sheet chosen and arranged so that:

The substrate is located between the counter-substrate and the third glazing sheet;

The substrate is set back relative to the counter-substrate over the entire circumference of the substrate; and The substrate is set back relative to the third glazing sheet over the entire circumference of the substrate.

According to particular embodiments, the manufacturing process according to the invention furthermore comprises one or more of the following technical features, applied individually or in any technically possible combination:

The substrate is made of glass that has not been thermally tempered, preferably that has not been chemically tempered and more preferably that has not been toughened;

the counter-substrate and/or the third glazing sheet is made of glass, the process comprising a step of tempering or toughening the counter-substrate and/or the third glazing sheet;

the cutting of the substrate from the motherboard is carried out using a thermal cutting method, for example laser cutting;

the glazing unit is moved without the substrate being placed in contact with a gripping or handling element;

the at least one film deposited on the motherboard comprises at least one electrode coating, in which process all the films of the electrochemical system are preferably deposited on the motherboard, and in which the substrate obtained by cutting is preferably laminated to the counter-substrate;

the substrate is set back relative to the counter-substrate and/or the third glazing sheet over the entire circumference of the substrate by at least 1 mm, preferably at least 2 mm, more preferably at least 5 mm and even more preferably at least 10 mm;

the substrate is able to withstand a temperature difference between a point on the substrate and a point on the edge of the substrate of at least 50° C. and preferably of at least 100° C.;

the substrate has a 4-point bending strength greater than or equal to 75 MPa, preferably greater than or equal to 100 MPa and more preferably greater than or equal to 120 MPa;

the counter-substrate is intended to be placed on the outside relative to the substrate, that is to say on the side on which sunlight is incident;

the electrochemical system is formed from a multilayer of films comprising successively, from the substrate, a first electrode coating, a first electrochemically active film, an electrolyte film, a second electrochemically active film and a second electrode coating, all the films of the multilayer being formed on the substrate;

the glazing is a multiple glazing unit, the third glazing sheet being spaced from the substrate and separated from the substrate by a layer of gas or vacuum; the substrate is surrounded by said layer of gas or vacuum, preferably over the entire circumference and the entire thickness of the substrate;

the glazing comprises a joint surrounding the substrate and in contact with the substrate over at least part of the circumference of the substrate, preferably in contact with the substrate over the entire circumference of the substrate;

the substrate is made of soda-lime-silica glass;

all the films of the electrochemical system are formed on the substrate;

securing a fourth glazing sheet that forms a second substrate to the counter-substrate, the second substrate being set back relative to the counter-substrate and the third glazing sheet; and laminating the substrate to the counter-substrate via a lamination interlayer.

Another subject of the invention is a process for manufacturing a plurality of glazing units, each glazing unit being obtained by a process as described above, the substrate of each of the various glazing units being obtained by cutting them from the same motherboard.

BRIEF DESCRIPTION OF THE DRAWINGS

The invention will be better understood on reading the following description, given merely by way of example and with reference to the appended drawings, in which.

The drawings are of course not to scale, for the sake of clarity, because the thickness differences, especially between the substrate and the deposited layers, are substantial—for example differing by about a factor of 500.

DESCRIPTION OF THE PREFERRED EMBODIMENTS

Figure 1:
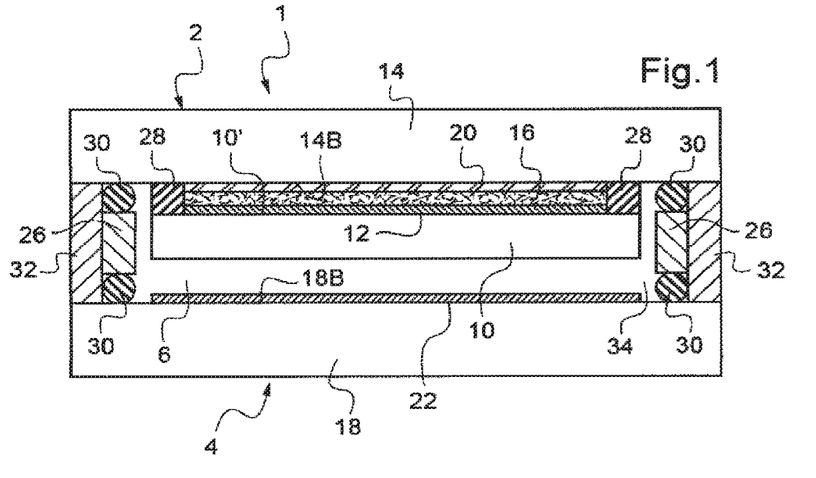
FIGS. 1 to 3 are schematic cross-sectional views of a glazing unit according to three embodiments of the invention.

The glazing unit 1 illustrated in FIG. 1 is a double glazing unit.

It comprises a first laminated glazing pane 2 and a second glazing pane 4 spaced from the first glazing pane 2 and separated from the latter by a layer 6 of gas, for example argon, or by a vacuum 6.

However, the invention is not limited to this type of glazing. Possible variants include single glazing, the glass sheets of which are all laminated together, or triple glazing or any other multiple glazing.

The term "double glazing" is understood to mean an assembly of two spaced glazing panes separated by a layer of gas or vacuum and the term "triple glazing" is understood to mean an assembly of three spaced glazing units separated by two layers of gas or vacuum, respectively. As described above, at least one of the spaced glazing panes of a multiple glazing unit may be laminated.

The laminated glazing pane 2 comprises:

a first glazing sheet 10 forming a substrate on which an electrochemical system 12 is formed, the electrochemical system having electrically controllable optical and/or energy related properties, this system being called a "functional" system in the remainder of the description; and a second glazing sheet 14 forming a counter-substrate, the counter-substrate 14 being laminated to the substrate 10 using a lamination interlayer 16.

The functional system 12 is of the all-solid-state type, that is to say that the films of the functional system 12 are formed on the same substrate 10. Further details will follow.

In the case of FIG. 1, the functional system 12 is formed on the outside face 10A of the substrate 10, that is to say the face on which sunlight is intended to be incident.

The second glazing pane 4 comprises a third glazing sheet 18.

The substrate 10 is located between the counter-substrate 14 and the third glazing sheet 18. The substrate is furthermore set back relative to the counter-substrate and to the third glazing sheet over its entire circumference.

The substrate is set back relative to the counter-substrate and the third glazing sheet by at least 2 mm, for example.

The substrate 10 is thus made of glass that has not been tempered. It may, for example, be a soda-lime-silica glass.

The term "soda-lime-silica glass" is understood to mean a glass the composition of which comprises silica ($SiO_2$), as a network-forming oxide, sodium oxide (soda, $Na_2O$) and calcium oxide (lime, CaO). This composition preferably comprises the following constituents having contents by weight that vary within the limits given below:

| | |
|---|---|
| $SiO_2$ | 60-75% |
| $Al_2O_3$ | 0-10% |
| $B_2O_3$ | 0-5%, preferably 0% |
| CaO | 5-15% |
| MgO | 0-10% |
| $Na_2O$ | 5-20% |
| $K_2O$ | 0-10% |
| BaO | 0-5%, preferably 0% |

Soda-lime-silica glasses have a relatively high thermal expansion coefficient, generally between $7 \times 10^{-6}$ $K^{-1}$ and $10 \times 10^{-6}$ $K^{-1}$.

However, as a variant, a glass of any suitable composition, for example a high thermal expansion coefficient glass like soda-lime-silica glass, may be used or, also as a variant, a glass with a thermal expansion coefficient lower than that of soda-lime-silica glass, like borosilicate glasses or a film glass, may be used. This substrate may be float glass, glass manufactured by the fusion-draw (up & down) process, or an extremely thin film glass (50 μm thick, for example).

It should be noted that the term "borosilicate glasses" is understood to mean glass having the following composition by mass:

| | |
|---|---|
| $SiO_2$ | 78-86% |
| $B_2O_3$ | 8-15% |
| $Al_2O_3$ | 0.9-5% |
| MgO | 0-2% |
| CaO | 0-1.5% |
| $Na_2O$ | 0-4% |
| $K_2O$ | 0-7% |

For example, the substrate 10 is thinner than the counter-substrate 14.

The substrate 10 has, for example, a thickness equal to 4 mm or less in the case of soda-lime-silica glass, for example a thickness equal to 1.6 mm.

The substrate 10 is able to withstand an edge stress, generated by a 4-point bending test, that is greater than or equal to 50 MPa and preferably greater than or equal to 80 MPa.

The substrate is also able to withstand a temperature difference between a point on the central part, or any other point, of the substrate 10 and a point on the edge of the substrate 10 of at least 50° C. and preferably of at least 100° C.

As for the counter-substrate 14, this is made of thermally or chemically tempered glass, toughened glass, or even glass that has not been tempered and the thermal expansion coefficient of which is near to that of the substrate 10, when the latter is made of low thermal expansion coefficient glass. The counter-substrate is preferably made of thermally tempered glass. The glass is for example a soda-lime-silica glass.

The third glass sheet 18 is made of thermally or chemically tempered glass or of toughened glass and preferably of thermally tempered glass, for example a soda-lime-silica glass. This glass may also be laminated if necessary, especially in the case of a skylight for safety reasons.

However, as a variant, the counter-substrate 14 and/or the third sheet 18 are made of a flexible material, for example a plastic.

The counter-substrate 14 and/or the third glazing sheet 18 have for example a thickness greater than or equal to 2 mm in the case of tempered or toughened soda-lime-silica glass, preferably a thickness greater than or equal to 5 mm.

As illustrated in FIG. 1, the glazing unit 1 defines an internal space 34 around the substrate 10 and between the substrate 10 and the third glazing sheet 18, separating the substrate from the third glazing sheet.

The internal space 34 is filled with a gas such as air, argon, krypton or a mixture of these gases, or else it is under partial vacuum in which the pressure is for example less than or equal to 10 mbar.

The substrate 10 is thus surrounded by the internal space 34, further reducing the risk of damaging the substrate 10. In particular, the substrate 10 is freed from any edge stress due to a direct contact with another element of the glazing unit 1.

The glazing unit 1 comprises means 26, 32 for holding the counter-substrate 14 and the third glazing sheet 18.

These holding means comprise a spacer bar 26 and an adhesive joint 32.

The spacer bar 26 is arranged around the substrate 10 and between the counter-substrate 14 and the third sheet 18, along the edges of the counter-substrate 14 and the third sheet 18.

The spacer bar 26 is designed to keep the counter-substrate 14 separated from the third glazing sheet 18 by a certain distance.

The spacer bar 26 is thus rigid, unlike the joint 32. The spacer bar is for example a strip, for example a metal strip.

The adhesive joint 32 is designed to hold the counter-substrate 14 and the third glazing sheet 18 together.

The adhesive joint is provided between the counter-substrate 14 and the third glazing sheet 18, for example over the entire circumference of the edges of the counter-substrate 14 and the third glazing sheet 18.

The adhesive joint 32 surrounds the spacer bar 26.

It is for example made of a polysulfide.

It should be noted that the joint 32 also seals the internal space 34.

The glazing unit 1 furthermore comprises sealing means 28, 30.

The sealing means comprises a first seal 28 placed between the substrate 10 and the counter-substrate 14 and around the functional system 12 over its entire circumference, sealing the latter. It is for example made of polyisobutylene. This seal 28 ensures the vacuum tightness of the internal space 34 and the functional system 12.

Two seals 30, which may also be made of polyisobutylene or of another suitable material, extend between the counter-substrate 14 and the spacer bar 26 and between the spacer bar 26 and the third glazing sheet 18, respectively, so as to seal the internal space 34 at the spacer bar 26.

However, it should be noted that the holding and sealing means are, as a variant, different. The number, arrangement and the nature of the holding and sealing means are of any suitable type.

Next, the glazing unit 1 is encapsulated in a frame (not illustrated) of any suitable type.

As illustrated in FIG. 1, the glazing unit 1 advantageously comprises a solar-protection film 20 formed on the inside face 14B of the counter-substrate 14, that is to say the side facing toward inside the building. This film reflects in the near infrared and thus limits the heat influx through the glazing unit 1.

Furthermore, the glazing unit 1 also advantageously comprises a low-E (low-emissivity) film 22, formed on the outside face 18B of the third glazing sheet 18, that reflects the radiation in the range emitted by a black body at a temperature of 20° C., namely in the mid-infrared, and thus prevents radiative heat loss from inside the building—especially useful in the wintertime.

In the case of glazing possessing other glazing sheets, the low-E film 22 is advantageously formed on the sheet that is closest to the inside of the building and the film 20 is formed on the glazing sheet closest to the outside.

The functional system 12 will now be described in greater detail.

In the present example, the functional system is an electrochromic system, that is to say a system the transparency of which is reversibly switched by applying an electric field; but, more generally, as a variant, the functional system may be an electrochemical system of any suitable type having electrically controllable optical and/or energy-related properties.

As a variant, the functional system 12 is for example a gasochromic system or a system the transmissivity of which does not vary in the visible range but in other ranges of the electromagnetic spectrum, for example in the infrared.

Since the electrochromic system is of the all-solid-state type it comprises for example:
- a first electrode coating formed on the substrate 10, for example based on tin-doped indium oxide (ITO) or a Ag-based TCC (transparent conductive coating);
- a first film of an electrochromic material formed on the first electrode coating, for example based on nickel oxide or iridium oxide or a mixture of both;
- a film forming the electrolyte is formed on the first film of electrochromic material and is, for example, based on tantalum oxide or a WO3/Ta20s bilayer;
- a second film of electrochromic material is formed on the film forming the electrolyte and is, for example, based on tungsten oxide; and
- a second electrode coating is formed on the second film of electrochromic material and is, for example, based on ITO.

However, as a variant any suitable all-solid-state electrochromic system might be used.

Applying a first electrical potential between the electrode coatings causes alkali ions such as $H^+$ or $Li^+$ or $K^+$ or even $Ag^+$ to be inserted into the first electrochromic film and ions to be extracted from the second electrochromic film, causing the functional system 12 to become colored.

Applying an electrical potential of opposite polarity causes the same ions to be extracted from the first electrochromic film and to be inserted into the second electrochromic film, causing the system 12 to become bleached.

Such all-solid-state electrochromic systems may be switched a very large number of times and for more than ten years, permitting them to be used as architectural glazing.

The lamination interlayer 16 ensures adhesion between the substrate 10 and the counter-substrate 14 such that the counter-substrate 14 supports the substrate 10.

The lamination interlayer 16 here is in contact with the functional system 12 of the solar-protection film 20.

The lamination interlayer is for example a film made of a thermoplastic, for example PU (polyurethane), EVA or PVB.

The lamination interlayer 16 typically has a thickness of between 0.3 mm and 5 mm.

The lamination of the counter-substrate 14 and the substrate 10 is achieved by means of the lamination interlayer 16. The lamination is typically obtained by heating the glazing unit 1 to a temperature of about 120° C. for 15 min, but there are many heating options.

EXAMPLE

The substrate 10 is a 6 mm thick sheet of soda-lime-silica glass.

The functional system 12 is an all-solid-state electrochromic system deposited directly onto the substrate 10 and consisting of the following multilayer, starting from the substrate 2:
- a 500 nm thick film of ITO forming a first electrode coating/a 55 nm thick film of iridium oxide forming a first electrochromic layer/a 100 nm thick layer of WO3/a 300 nm thick layer of tantalum oxide forming the electrolyte/a 400 nm thick layer of H+-doped tungsten oxide forming a second electrochromic layer/a 100 nm thick layer of ITO forming a second electrode coating.

The lamination interlayer 16 is in contact with the functional system 12. The lamination interlayer is a 0.76 mm thick sheet of polyurethane.

The interlayer 16 is in contact with the functional system.

The solar-protection film 20 is a silver (Ag) unilayer, bilayer or trilayer film formed directly on the inside face 14B of the counter-substrate 14.

The low-E film is an Ag unilayer, bilayer or trilayer film formed directly on the outside face 18A of the third glazing sheet 18.

All the films are produced by magnetron sputtering.

The arrangement of the device 1 is therefore the following:
- (building exterior) tempered or toughened glass sheet/solar-protection film/0.76 mm thick polyurethane lamination interlayer/100 nm of ITO/400 nm of tungsten oxide/300 nm of tantalum oxide/100 nm of tungsten oxide/55 nm of iridium oxide/1.6 mm thick sheet of glass that has not been tempered or toughened/gas-filled cavity/low-E film/6 mm tempered glass sheet.

Figure 1A:
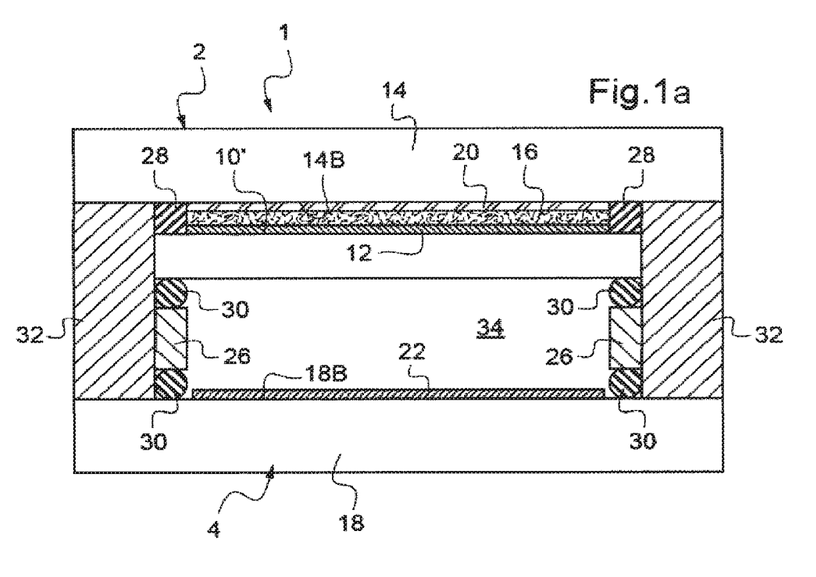

FIG. 1a illustrates a variant of the first embodiment of FIG. 1, in which equivalent elements have been given identical reference numbers. Only the differences between the glazing unit of FIG. 1 will be described below.

In this variant, the spacer bar 26 is arranged between the substrate 10 and the third glazing sheet 18.

The seals 30 are still placed between the substrate 10 and the spacer bar 26 and between the third glazing sheet 18 and the spacer bar 26.

The adhesive joint 32 here is placed directly in contact with the substrate 10, which allows the active area of the functional system 12 to be increased.

The internal space 34 around the substrate 10 is eliminated.

The internal space 34 here only extends between the substrate 10 and the third glazing sheet 18.

Figure 2:
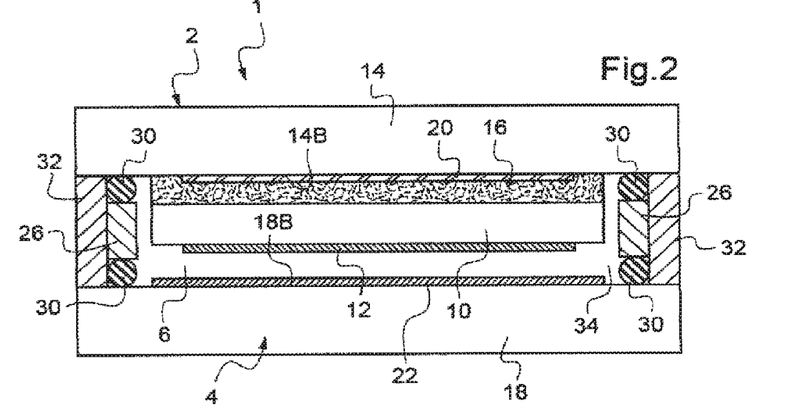

FIG. 2 illustrates a second embodiment of the invention in which equivalent elements have been given identical reference numbers. Only the differences between the first embodiment will be described below.

The functional system 12 here is formed on the inside face 10B of the substrate 10.

The seal 28 is absent as it is no longer required.

The outline of the lamination interlayer 16 follows the edges of the substrate 10.

In this second embodiment, the films are less mechanically stressed and the electrochromic films can therefore be more fragile.

The first electrochromic film is for example a tungsten oxide film into which lithium ions are inserted during deposition forming $WO_x$:Li, or a tungsten oxide film onto the surface of which film lithium ions are deposited.

The second electrochromic film is for example made of tungsten-doped nickel oxide ($NiWO_x$).

The insertion ions are in this example lithium ions but they may also be other alkali ions such as $H^+$ or $K^+$ or even $Ag^+$.

It should be noted that the functional system 12 will advantageously be covered by a protective film for example made of $SiO_2$ deposited onto the functional system 12.

Figure 2A:
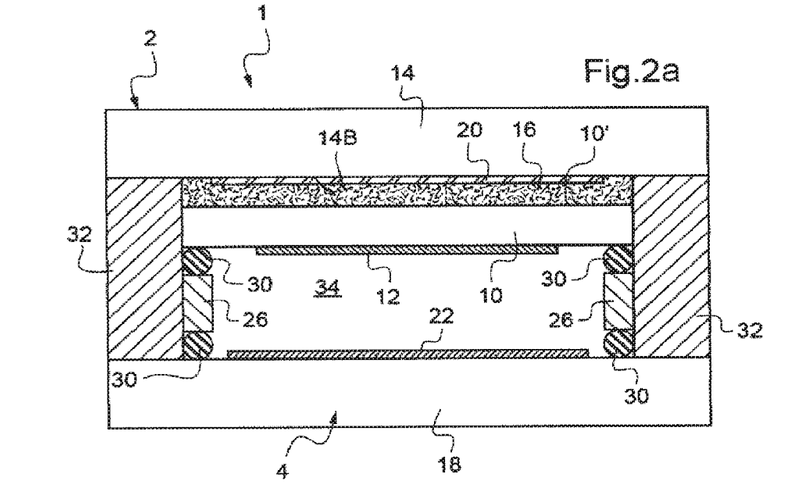

FIG. 2a illustrates a variant of the second embodiment of FIG. 2 in which equivalent elements have been given identical reference numbers. Only the differences between the glazing of FIG. 2 will be described below.

This variant is analogous to the variant of FIG. 1a of the first embodiment.

In this variant, the spacer bar 26 is arranged between the substrate 10 and the third glazing sheet 18.

The spacer bar 26 presses against the substrate 10 around the functional system 12.

The seals 30 are again placed between the substrate 10 and the spacer bar 26 and between the third glazing sheet 18 and the spacer bar 26.

The adhesive joint 32 is placed directly in contact with the substrate 10.

The internal space 34 around the substrate 10 is eliminated.

The internal spacer bar 34 only extends between the substrate 10 and the third glazing sheet 18.

Figure 3:
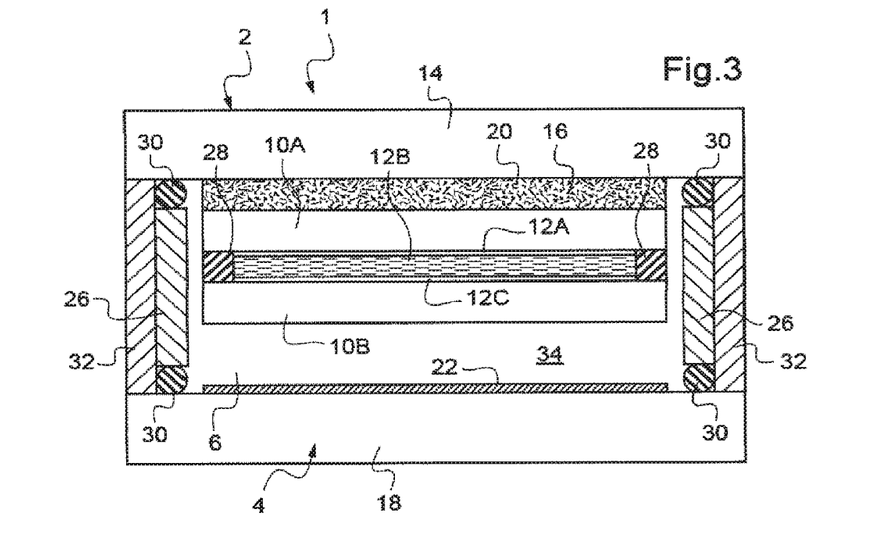

FIG. 3 illustrates a third embodiment of the invention in which equivalent elements have been given identical reference numbers. Only the differences between the first embodiment will be described below.

Here the functional system 12 is not an all-solid-state system, that is to say only some of the films of the functional system 12 are deposited onto a first glass substrate 10A, the rest being deposited onto a second glass substrate 10B.

The substrates 10A and 10B have the same characteristics as the substrate 10 of the aforementioned embodiments, that is to say that they are set back relative to the counter-substrate 14 and the third glazing sheet 18 and that they have the same characteristics as the substrate 10.

The substrates 10A and 10B are furthermore laminated to the counter-substrate using a lamination interlayer 16.

The functional system 12 illustrated in FIG. 3 comprises:
an electrode coating 12A formed on the substrate 10A;
an active medium 12B; and
an electrode coating 12C formed on the counter-substrate 10B.

The active medium may be of any suitable type, that is to say any organic, polymer or hybrid medium.

EP-A-0612826 describes for example organic active media. They are generally gels or organic solutions that can undergo a reduction-oxidation reaction when an electrical potential is applied—these becoming colored or bleached accordingly.

WO-A-03/098339 describes an all-polymer active medium. In these systems, two polymer electrochromic films, into which and from which ions can be inserted and extracted respectively, are separated by an organic electrolyte.

EP-0253713 and EP-0670346, EP-0382623, EP-0518754 or EP-0532408 describes hybrid electrochromic systems. In these systems, the electrochromic films are solid-state films, for example identical to those of the all-solid-state systems, but the electrolyte is a polymer or an organic gel. It may be formed by a lamination interlayer which is an ionomer.

The seal 28 in this third embodiment has both a sealing function and a holding function, the substrate 10A being held secure to the substrate 10B by the seal 28 alone, which is for example made of polyisobutylene.

Figure 3A:
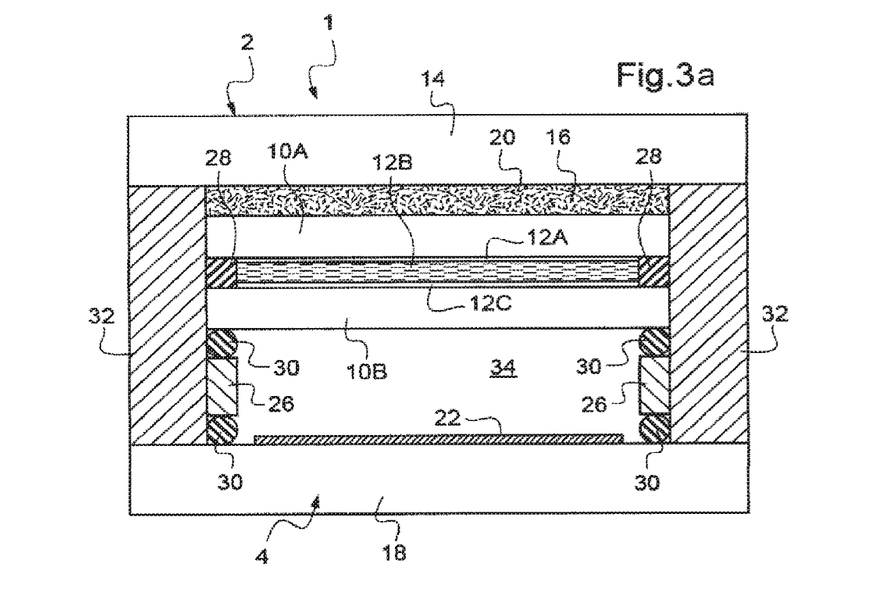
FIG. 3a illustrates a variant of the embodiment of FIG. 3.

FIG. 3a illustrates a variant of the third embodiment of FIG. 3 in which equivalent elements have been given identical reference numbers. Only the differences between the glazing unit of FIG. 3 will be described below.

This variant is analogous to the variants in FIGS. 1a and 2a.

In this variant, the spacer bar 26 is arranged between the substrate 10 and the third glazing sheet 18.

The spacer bar 26 presses against the substrate 10 around the functional system 12.

The seals 30 are again placed between the substrate 10 and the spacer bar 26 and between the third glazing sheet 18 and the spacer bar 26.

The adhesive joint 32 is placed directly in contact with the substrate 10.

The internal space 34 around the substrate 10 is eliminated.

The internal space 34 only extends between the substrate 10 and the third glazing sheet 18.

The advantage of the third embodiment relates to the intrinsically lower possible cost of the functional system compared to the systems of the two first embodiments.

The all-solid-state system according to the two first embodiments has the advantage of allowing the substrate 10 to be cut from a single motherboard on which all the films are present, whereas in the third embodiment only the electrode coating is optionally present on the motherboard from which the substrates 10A and 10B are cut. Both the cost and the flexibility of manufacturing the glazing according to the two first embodiments may thus prove to be more advantageous despite the intrinsically higher cost.

Figure 4:
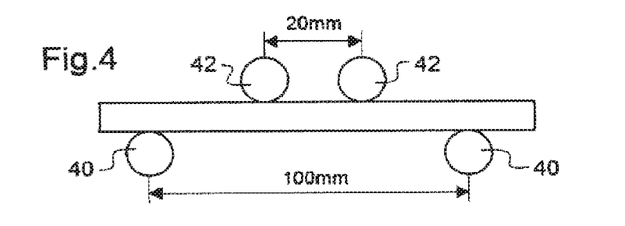
FIG. 4 is a schematic view showing a process for measuring the strength of the edge of a glass sheet.

FIG. 4 illustrates the test that was carried out on the glass sheets intended to be used as substrates. It is a standard 4-point bending test as defined for example by the DIN EN 1288-3:2000 standard.

This test consists in cutting a test piece from a glass sheet and placing the test piece on two parallel support rollers 40 spaced 100 mm apart.

Two rollers called load rollers 42, parallel to each other and parallel to the support rollers, are spaced 20 mm apart and are placed symmetrically with respect to the plane of symmetry of the two support rollers.

The load rollers are applied to the glass sheet along the direction of the symmetry plane and toward the support rollers with a load that increases at a constant rate of $2N/mm^2s$ until the glass sheet breaks.

The moment at which the sheet breaks determines the bending strength of the test piece.

Experiments were carried out on 9 sets of glass substrate samples using the 4-point bending test described above so as to evaluate the bending strength of each of the samples.

In the following, abbreviations have been used to describe the process used to cut the test pieces tested:
LBIS stands for laser beam induced separation: a 1064 nm wavelength 10 W Nd:YAG laser was used, the cutting speed was about 100 mm/s;
TLS stands for thermal laser separation: a 10.6 µm wavelength 150 W CO2 laser was used, the cutting speed was at least 600 mm/s;
ETC stands for electro-thermal cutting, a process developed by PicoDRILL, a company based in Lausanne (Switzerland), which consists in cutting the glass by locally heating it along the cutting line using an electrical discharge between two conducting points through the glass. This local heating may optionally be followed by cooling, for example using compressed air. The voltage between the two points is about 2 to 25 kV, typically 10 kV for a cutting speed of the order of cm/s;
ETEC (or ETC_Chamfering) stands for electro-thermal edge chamfering, also a process developed by Pico-DRILL in Lausanne (Switzerland), which consists in heating, with dielectric losses, an end of the glass to be chamfered, using a strong electric field generated at a conducting point that moves along this end. This heating results in a local stress which leads to a part of the end "debonding" in the form of a glass fiber which can then be removed. The speed of this process is typically about 20-30 mm/s;
mechanical cutting with 45° shaping ("45") or rounded joint shaping ("C") , mechanical cutting with a diamond wheel and grinding;

PLX glass: soda-lime-silica glass, the composition by weight of which is the following:

| | |
|---|---|
| $SiO_2$ | 72% |
| $Al_2O_3$ | 1% |
| $B_2O_3$ | 0% |
| CaO | 9% |
| MgO | 3% |
| $Na_2O$ | 14% |
| $K_2O$ | 0.5% |
| BaO | 0% |
| Impurities: | 0.5%; | and

Borofloat glass: borosilicate glass, the composition by weight of which is the following:

| | |
|---|---|
| $SiO_2$ | 81% |
| $B_2O_3$ | 13% |
| $Al_2O_3$ | 2% |
| $Na_2O$ | 4% |

For each set, approximately at least five 140 mm×50 mm×50 mm samples were studied. The nine sets of samples tested were the following:
LBIS_PLX: PLX glass, LBIS laser cut;
TLS_PLX: PLX glass, TLS laser cut;
TLS_Boro: Borofloat glass, TLS laser cut;
PLX_45: PLX glass, mechanical cut with 45° shaping;
PLX_C: PLX glass, mechanical cut with rounded joint shaping;
Boro_45: Borofloat glass, mechanical cut with 45° shaping;
ETC: PLX glass, ETC cut; and
ETC_Chamfering: PLX glass, ETC cut+chamfering.

Figure 5:
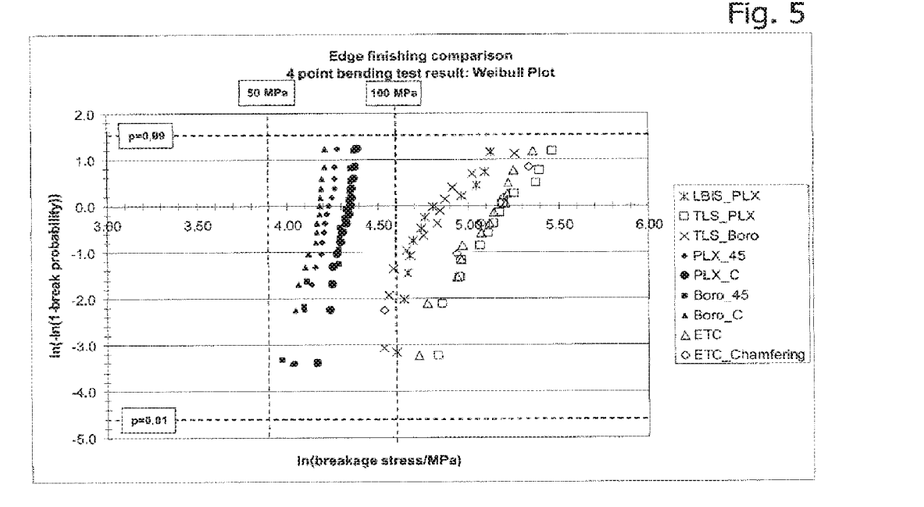
FIG. 5 is a graph illustrating the results of an experiment measuring the strength of the edge of various cut glass sheets.

The results are presented in FIG. 5 and in the tables below.

The ordinates of FIG. 4 show the break probability of the sample according to Weibull statistics.

The abscissae of FIG. 4 indicate the maximum 4-point bending strength.

Table 1 illustrates, for each set, the bending strength of each sample tested in MPa. The second column presents the calculated break probability at this test strength. The number of rows in a column corresponds to the number of samples tested.

Table 2 presents the same results as table 1 except that the calculation of the break probability has been replaced by the Weibull statistic relative to the break risk and the bending strength has been replaced by its logarithm. This table corresponds to the values plotted in FIG. 5.

In a building application the substrate will preferably have a 4-point bending strength greater than or equal to 75 MPa, more preferably greater than or equal to 100 MPa and even more preferably greater than or equal to 120 MPa.

All the thermally cut glasses were shown to meet this criteria, unlike the mechanically cut glasses.

It was also observed that soda-lime-silica glass can perform as well as a low thermal expansion coefficient glass such as borosilicate glass.

Chamfering was found to have a significant effect on ETC cut glass.

| 1 | | 2 | | 3 | | 4 | | 5 | |
|---|---|---|---|---|---|---|---|---|---|
| LBIS_PLX | LBIS_PLX | TLS_PLX | TLS_PLX | TLS_Boro | TLS_Boro | PLX_45 | PLX_45 | PLX_C | PLX_C |
| 99.93 | 4.17% | 126.01 | 3.85% | 92.87 | 4.55% | 56.81 | 3.33% | 64.19 | 3.33% |
| 104.49 | 12.50% | 129.39 | 11.54% | 95.72 | 13.64% | 60.15 | 10.00% | 69.23 | 10.00% |
| 106.12 | 20.93% | 141.85 | 19.23% | 98.43 | 22.73% | 62.35 | 16.67% | 69.95 | 16.67% |
| 108.01 | 29.17% | 143.14 | 26.92% | 105.85 | 31.82% | 63.61 | 23.33% | 70.38 | 23.33% |
| 109.37 | 37.50% | 158.88 | 34.62% | 116.14 | 40.91% | 66.03 | 30.00% | 72.02 | 30.00% |
| 114.82 | 45.83% | 166.69 | 42.31% | 125.11 | 50.00% | 66.24 | 36.67% | 73.48 | 36.67% |
| 116.64 | 54.17% | 171.31 | 50.00% | 127.45 | 59.09% | 67.11 | 43.33% | 74.19 | 43.33% |
| 122.02 | 62.50% | 176.89 | 57.69% | 130.85 | 68.18% | 67.24 | 50.00% | 75.84 | 50.00% |
| 143.51 | 70.83% | 180.18 | 65.38% | 136.31 | 77.27% | 68.1 | 56.67% | 77 | 56.67% |
| 155.99 | 79.17% | 192.26 | 73.08% | 151.97 | 86.36% | 68.6 | 63.33% | 77.68 | 63.33% |
| 163.19 | 87.50% | 216.2 | 80.77% | 192.71 | 95.45% | 70.18 | 70.00% | 78.06 | 70.00% |
| 167.81 | 95.83% | 221.44 | 88.46% | | | 71 | 76.67% | 78.27 | 76.67% |
| | | 236.84 | 96.15% | | | 71.16 | 83.33% | 79.28 | 83.33% |
| | | | | | | 71.24 | 90.00% | 79.87 | 90.00% |
| | | | | | | 72.23 | 96.67% | 80.31 | 96.67% |

| 6 | | 7 | | 8 | | 9 | |
|---|---|---|---|---|---|---|---|
| Boro_45 | Boro_45 | Boro_C | Boro_C | ETC | ETC | ETC_Chamfering | ETC_Chamfering |
| 52.92 | 3.57% | 55.98 | 3.33% | 112.7 | 3.85% | 93.24 | 10.00% |
| 60.11 | 10.71% | 57.22 | 10.00% | 118.6 | 11.54% | 136.69 | 30.00% |
| 61.02 | 17.86% | 58.06 | 16.67% | 139.77 | 19.23% | 159.8 | 50.00% |
| 72.7 | 25.00% | 60.31 | 23.33% | 143.1 | 26.92% | 180.86 | 70.00% |
| 72.78 | 32.14% | 61.67 | 30.00% | 143.85 | 34.62% | 208.24 | 90.00% |
| 73.15 | 39.29% | 63.92 | 36.67% | 159.8 | 42.31% | | |
| 73.39 | 46.43% | 64.18 | 43.33% | 167.25 | 50.00% | | |
| 74.9 | 53.57% | 64.34 | 50.00% | 171.19 | 57.69% | | |
| 75.93 | 60.71% | 65.26 | 56.67% | 183.23 | 65.38% | | |
| 77.1 | 67.86% | 65.46 | 63.33% | 184.3 | 73.08% | | |
| 77.34 | 75.00% | 65.65 | 70.00% | 186.02 | 80.77% | | |
| 77.67 | 82.14% | 66.02 | 76.67% | 191.03 | 88.46% | | |
| 77.83 | 89.29% | 66.37 | 83.33% | 211.9 | 96.15% | | |
| 79.26 | 96.43% | 67.37 | 90.00% | | | | |
| | | 67.38 | 96.67% | | | | |

| 1 | | 2 | | 3 | | 4 | | 5 | |
|---|---|---|---|---|---|---|---|---|---|
| LBIS_PLX | LBIS_PLX | TLS_PLX | TLS_PLX | TLS_Boro | TLS_Boro | PLX_45 | PLX_45 | PLX_C | PLX_C |
| 4.60 | −3.16 | 4.84 | −3.24 | 4.53 | −3.07 | 4.04 | −3.38 | 4.16 | −3.38 |
| 4.65 | −2.01 | 4.85 | −2.10 | 4.56 | −1.92 | 4.10 | −2.25 | 4.24 | −2.25 |
| 4.66 | −1.45 | 4.95 | −1.54 | 4.59 | −1.36 | 4.13 | −1.70 | 4.25 | −1.70 |
| 4.68 | −1.06 | 4.96 | −1.16 | 4.66 | −0.96 | 4.15 | −1.33 | 4.25 | −1.33 |
| 4.69 | −0.76 | 5.07 | −0.86 | 4.75 | −0.64 | 4.19 | −1.03 | 4.28 | −1.03 |
| 4.74 | −0.49 | 5.12 | −0.60 | 4.83 | −0.37 | 4.19 | −0.78 | 4.30 | −0.78 |
| 4.76 | −0.25 | 5.14 | −0.37 | 4.85 | −0.11 | 4.21 | −0.57 | 4.31 | −0.57 |
| 4.80 | −0.02 | 5.18 | −0.15 | 4.87 | 0.14 | 4.21 | −0.37 | 4.33 | −0.37 |
| 4.97 | 0.21 | 5.19 | 0.06 | 4.91 | 0.39 | 4.22 | −0.18 | 4.34 | −0.18 |
| 5.08 | 0.45 | 5.26 | 0.27 | 5.02 | 0.69 | 4.23 | 0.00 | 4.35 | 0.00 |
| 5.09 | 0.73 | 5.38 | 0.50 | 5.26 | 1.13 | 4.25 | 0.19 | 4.36 | 0.19 |
| 5.12 | 1.16 | 5.40 | 0.77 | | | 4.26 | 0.38 | 4.36 | 0.38 |
| | | 5.47 | 1.18 | | | 4.26 | 0.58 | 4.37 | 0.58 |
| | | | | | | 4.27 | 0.83 | 4.38 | 0.83 |
| | | | | | | 4.28 | 1.22 | 4.39 | 1.22 |

| 6 | | 7 | | 8 | | 9 | |
|---|---|---|---|---|---|---|---|
| Boro_45 | Boro_45 | Boro_C | Boro_C | ETC | ETC | ETC_Chamfering | ETC_Chamfering |
| 3.97 | −3.31 | 4.02 | −3.38 | 4.72 | 3.24 | 4.54 | −2.25 |
| 4.10 | −2.18 | 4.05 | −2.25 | 4.78 | 2.10 | 4.94 | −1.03 |
| 4.11 | −1.63 | 4.06 | −1.70 | 4.94 | 1.54 | 5.07 | −0.37 |
| 4.29 | −1.25 | 4.10 | −1.33 | 4.96 | 1.16 | 5.20 | 0.19 |
| 4.29 | −0.95 | 4.12 | −1.03 | 4.97 | 0.86 | 5.34 | 0.83 |
| 4.29 | −0.70 | 4.16 | −0.78 | 5.07 | 0.60 | | |
| 4.30 | −0.47 | 4.16 | −0.57 | 5.12 | 0.37 | | |
| 4.32 | −0.26 | 4.16 | −0.37 | 5.14 | 0.15 | | |
| 4.33 | −0.07 | 4.18 | −0.18 | 5.21 | 0.06 | | |
| 4.35 | 0.13 | 4.18 | 0.00 | 5.22 | 0.27 | | |
| 4.35 | 0.33 | 4.18 | 0.19 | 5.23 | 0.50 | | |
| 4.35 | 0.54 | 4.19 | 0.38 | 5.25 | 0.77 | | |
| 4.35 | 0.80 | 4.20 | 0.58 | 5.36 | 1.18 | | |
| 4.37 | 1.20 | 4.21 | 0.83 | | | | |
| | | 4.21 | 1.22 | | | | |

It also proved to be possible to use thin toughened glass.

It was thus possible to identify glasses that would both lend themselves well to being cut from a motherboard and that would support a functional system that would cause the central part of the glazing to become very hot in a building application.

The arrangement of the glazing furthermore enables the glass substrate to retain its edge strength properties, which are related to the ability of the substrate to withstand a large temperature difference between its center and its edges.

Another subject of the invention is a process for manufacturing a glazing unit 1.

The process comprises steps consisting in:
depositing all the films of the functional system 12 having electrically controllable optical and/or energy-related properties on a motherboard and cutting the substrate 10 from the motherboard;
laminating the substrate 10 to the counter-substrate 14; and
securing the counter-substrate 14 to the third glazing sheet 18.

Furthermore, the substrate 10 is a glass sheet that has been chosen and arranged such:
the substrate 10 is located between the counter-substrate 14 and the third glazing sheet 18;
the substrate 10 is set back relative to the counter-substrate over the entire circumference of the substrate; and
the substrate 10 is set back relative to the third glazing sheet 18 over the entire circumference of the substrate 10.

The substrate 10 is cut for example using a thermal cutting method, for example a laser cutting method.

The process furthermore comprises a step consisting in thermally or even chemically tempering or thermally toughening the counter-substrate 14 using the well-known air-tempering or air-toughening process before lamination to the substrate 10.

Furthermore, the third glazing sheet 18 is for example tempered or toughened before it is secured to the counter-substrate 14.

According to another feature of the process, the glazing is moved, without touching the substrate 10, with a gripping or handling element, so as to further reduce the risk of damaging the substrate 10. An additional step, during the manufacturing process, may consist in protecting the edges of the glass after the cutting step, advantageously before any other step, using a polymer, lacquer or any other material (applied by extrusion, spraying, etc.). This protective element may be removed or left in place when the glass is fitted into a double glazing unit.

The glazing unit 1 obtained by the process has all the features described above.

The invention claimed is:

1. A glazing unit comprising:
a first glazing sheet forming a substrate;
an electrochemical system including a first film disposed on the substrate and a second film including an electrochromic material directly disposed over the first film, the electrochemical system having at least one of an optical-related property or an energy-related property that is electrically controllable;
a second glazing sheet forming a counter-substrate, wherein the substrate is set back relative to the counter-substrate over at least a portion of a circumference of the substrate, and wherein the substrate is between the electrochemical system and the counter-substrate;
a gas gap between the substrate and a third glazing sheet, wherein the gas gap is in direct contact with the substrate; and
an adhesive joint in contact with the substrate over an entire circumference of the substrate.

2. The glazing unit of claim 1, wherein the substrate is not toughened or tempered, and wherein the counter-substrate comprises toughened or tempered glass.

3. The glazing unit of claim 1, wherein the substrate comprises a laser-cut edge.

4. A glazing unit comprising:
a first glazing sheet forming a substrate, wherein the substrate is not toughened or tempered;
an electrochemical system including a first film disposed on the substrate and a second film including an electrochromic material directly disposed on the first film, the electrochemical system having at least one of an optical-related property or an energy-related property that is electrically controllable;
a second glazing sheet forming a counter-substrate, wherein the counter-substrate comprises toughened or tempered glass, and wherein the substrate is set back relative to the counter-substrate over at least a portion of a circumference of the substrate;
a third glazing sheet, wherein the substrate is set back relative to the third glazing sheet over at least a portion of the circumference of the substrate;
an internal space between the substrate and the third glazing sheet;
an adhesive joint in contact with the counter substrate and in contact with the third glazing sheet; and
a gap between the electrochemical system and the adhesive joint, wherein the gap is a portion of the internal space filled with a gas, wherein the gap is at least partially defined by a portion of the substrate, wherein the adhesive joint seals the internal space.

5. The glazing unit of claim 4, wherein the substrate is between the electrochemical system and the counter-substrate.

6. The glazing unit of claim 1, wherein the substrate is attached to the counter-substrate via an interlayer.

7. The glazing unit of claim 1, wherein the electrochemical system comprise a first electrode coating, a first electrochemically active film, an electrolyte film, a second electrochemically active film and a second electrode coating.

8. The glazing unit of claim 4, wherein the electrochemical system is disposed between the substrate and the counter-substrate.

9. The glazing unit of claim 1, wherein the substrate has a thickness not greater than 4 mm.

10. The glazing unit of claim 1, wherein the substrate is capable of withstanding an edge stress of at least 50 MPa, a temperature difference between a point on the substrate and a point on an edge of the substrate of at least 50°, or both.

11. A glazing unit, comprising:
a first glazing sheet forming a substrate;
an electrochemical system disposed on the substrate including an electrochromic material;
a second glazing sheet forming a counter-substrate, wherein the substrate is set back relative to the counter-substrate over at least a portion of a circumference of the substrate, and wherein the substrate is between the electrochemical system and the counter-substrate;
a third glazing sheet; and
a gap at least partially defined by the third glazing sheet and the substrate, wherein the gap is filled with a gas.

12. The glazing unit of claim 1, where the substrate is a first substrate and the glazing unit further comprises a second substrate, wherein at least one film of the electrochemical system is disposed on the second substrate.

13. The glazing unit of claim 12, wherein the second substrate is set back relative to the counter-substrate over at least a portion of a circumference of the second substrate.

14. The glazing unit of claim 1, wherein the substrate is between the counter-substrate and the third glazing sheet, wherein the electrochemical system is between the substrate and the third glazing sheet and not in contact with the third glazing sheet.

15. The glazing unit of claim 11, wherein the substrate is set back relative to the third glazing sheet over at least a portion of the circumference of the substrate.

16. The glazing unit of claim 14, wherein the third glazing sheet comprises toughened or tempered glass.

17. The glazing unit of claim 14, further comprising a low-E film disposed on the third glazing sheet.

18. The glazing unit of claim 14, wherein the first glazing sheet comprises soda-lime-silica glass.

19. The glazing unit of claim 11, wherein the gas is in direct contact with at least one of the counter-substrate, or the electrochemical system.

20. The glazing unit of claim 1, comprising a space bar disposed between the substrate and the third glazing sheet, wherein the space bar is in direct contact with the gas gap.

* * * * *

UNITED STATES PATENT AND TRADEMARK OFFICE
CERTIFICATE OF CORRECTION

PATENT NO. : 11,650,410 B2
APPLICATION NO. : 16/896734
DATED : May 16, 2023
INVENTOR(S) : René Gy et al.

Page 1 of 1

It is certified that error appears in the above-identified patent and that said Letters Patent is hereby corrected as shown below:

On the Title Page

In Column 1, Item (56), FOREIGN PATENT DOCUMENTS, page 3, Line 11, please delete "11/2004" and insert --11/2005--

In Column 2, Item (56), OTHER PUBLICATIONS, page 3, Line 20, please delete "Lignell (200) "A" and insert --Lignell (2002) "A--

In Column 2, Item (56), OTHER PUBLICATIONS, page 3, Line 25, please delete "of Engineered materials" and insert --of Engineering materials--

In Column 2, Item (56), OTHER PUBLICATIONS, page 3, Line 29, please delete "Internaitonal Search" and insert --International Search--

In Column 2, Item (56), OTHER PUBLICATIONS, page 3, Line 29-30, please delete "for Applicaiton No." and insert --for Application No.--

In Column 2, Item (56), OTHER PUBLICATIONS, page 3, Line 38, please delete "pp.87-104." and insert --pages 87-104, 2007.--

In the Claims

In Column 17, Line 50, please delete "system comprise a" and insert --system comprises a--

In Column 18, Line 46, please delete "counter-substrate, or" and insert --counter-substrate, substrate, or--

Signed and Sealed this
Twenty-second Day of October, 2024

Katherine Kelly Vidal
*Director of the United States Patent and Trademark Office*